Figure 1:
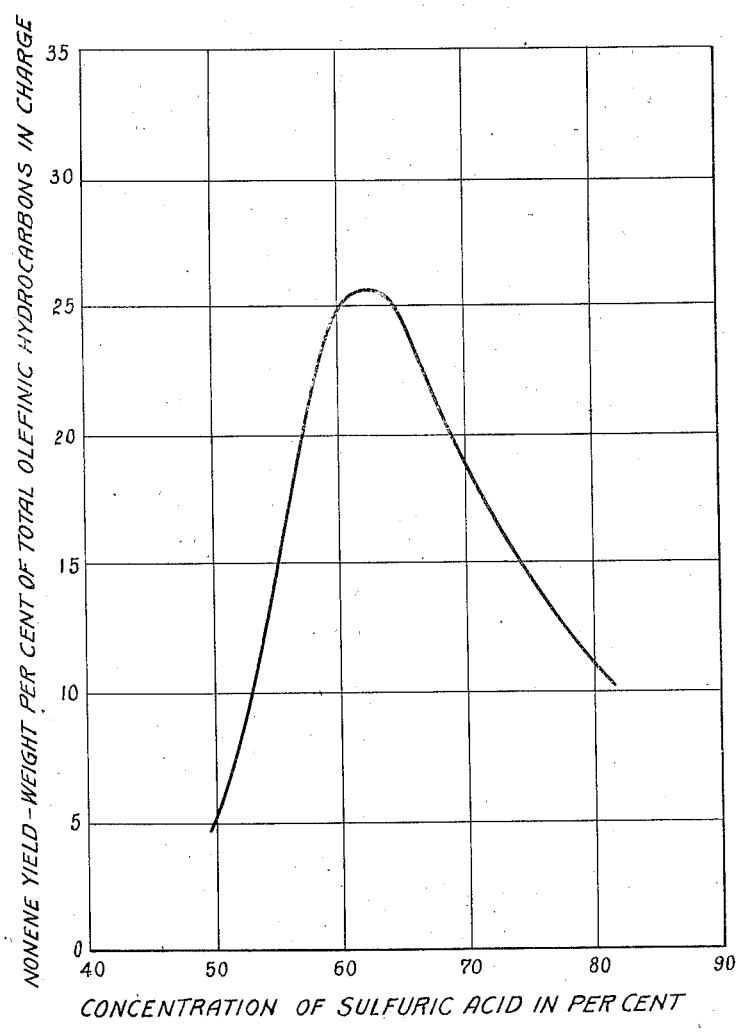

June 3, 1947. G. C. JOHNSON 2,421,422
INTERPOLYMERIZATION OF ISOBUTENE AND ISOPENTENES
IN THE PRESENCE OF SULFURIC ACID
Filed Dec. 19, 1944 2 Sheets-Sheet 1

INVENTOR
GEORGE CHRYSLER JOHNSON
BY
ATTORNEY

June 3, 1947.  G. C. JOHNSON  2,421,422
INTERPOLYMERIZATION OF ISOBUTENE AND ISOPENTENES
IN THE PRESENCE OF SULFURIC ACID
Filed Dec. 19, 1944  2 Sheets-Sheet 2

INVENTOR
GEORGE CHRYSLER JOHNSON
BY
ATTORNEY

Patented June 3, 1947

2,421,422

UNITED STATES PATENT OFFICE 2,421,422

INTERPOLYMERIZATION OF ISOBUTENE AND ISOPENTENES IN THE PRESENCE OF SULFURIC ACID

George Chrysler Johnson, Woodbury, N. J., assignor to Socony-Vacuum Oil Company, Incorporated, a corporation of New York Application December 19, 1944, Serial No. 568,856

9 Claims. (Cl. 260—683.15)

This invention relates to the production of mixtures of highly-branched nonenes, and is more particularly concerned with the production of high yields of mixtures of highly-branched nonenes through the interpolymerization of isobutene and isopentenes.

Polymerization is a term well known in the art and connotes reactions whereby a union between and/or among molecules of unsaturated hydrocarbons is effected to produce compounds called dimers, trimers, etc., generally referred to as polymers, the molecular weights of which are multiples of the molecular weight of the original hydrocarbons. The conditions of temperature, pressure, etc., under which the polymerization reaction is effected are called polymerizing conditions.

By suitable control of the polymerizing conditions, the union can take place between and/or among molecules of a single unsaturated hydrocarbon, or between and/or among molecules of two or more dissimilar unsaturated hydrocarbons, to produce compounds that represent additions of two or more molecules of a single unsaturated hydrocarbon or of the molecules of two or more dissimilar unsaturated hydrocarbons. The latter type of polymerization is herein referred to as interpolymerization and, depending on the extent of the reaction, the polymers may be inter-dimers, inter-trimers, etc.

As is well known to those familiar with the art, polymerization reactions of the type referred to hereinbefore, ordinarily are carried out in the presence of substances that accelerate the reaction and permit the use of relatively lower operating temperatures and pressures. These substances are called polymerization catalysts. Several substances have been proposed as polymerization catalysts, and among the most widely used are phosphoric acid, alumina-silica, copper pyrophosphate, sulfuric acid, hydrogen fluoride, aluminum chloride, and boron trifluoride. Often, the choice of a suitable polymerization catalyst depends upon whether the reaction is to be carried out in the vapor phase or in the liquid phase.

Sulfuric acid has been a preferred polymerization catalyst when liquid phase methods are employed, in view of the fact that the sulfuric acid also serves as a medium for the extraction, absorption, or solution of the unsaturated hydrocarbon reactants. In carrying out polymerization reactions involving olefinic hydrocarbons, in the presence of sulfuric acid, it has been the practice to initially absorb the olefinic hydrocarbon reactants in the sulfuric acid at temperatures of the order of 0–30° C., and subsequently, to subject the mixture to polymerizing conditions, or to pass the olefinic hydrocarbon reactants into the sulfuric acid under conditions at which absorption of the reactants in the acid and polymerization occur substantially simultaneously; or, in interpolymerization operations, to initially absorb one of the olefinic hydrocarbons in the sulfuric acid at absorption temperatures, to heat this mixture to interpolymerization temperature, and finally, to contact the dissimilar olefinic hydrocarbon with the mixture.

The patents to Deanesly et al., Nos. 2,181,640 and 2,342,074, disclose, inter alia, a process for interpolymerizing isobutene with isopentenes in the presence of sulfuric acid, to produce a nonene fraction consisting for the most part of the olefinic hydrocarbons 2,3,4,4-tetramethyl pentene-1; 3,5,5-trimethyl hexene-2; and 2,4,4-trimethyl hexene-2. The nonene fraction can be hydrogenated to a mixture of nonanes by contacting it with hydrogen in the presence of a nickel hydrogenation catalyst. Deanesly et al. found that the mixture of nonanes thus obtained was an excellent anti-knock motor fuel.

It is also well-known in the art to react tertiary butyl alcohol and tertiary amyl alcohol to produce a nonene fraction among which the olefinic hydrocarbons 2,3,3,4-tetramethyl pentene-1; 2,3,4,4 - tetramethyl pentene - 1; 2,3,4,4-tetramethyl pentene-2; 3,5,5-trimethyl hexene-2; 3,5,5-trimethyl hexene-3; and 2,4,4-trimethyl hexene-2, have been identified. In practice, the reaction is effected in the presence of sulfuric acid, and is carried out by introducing a mixture of the reactants and sulfuric acid into a reaction zone kept at temperatures varying between about 80° C. and about 110° C., under atmospheric pressure or superatmospheric pressures. The mixtures of nonenes thus obtained may be hydrogenated with hydrogen in the presence of a nickel hydrogenation catalyst, to produce a mixture of the corresponding nonanes.

Although it has been proposed to employ this mixture of nonanes as a constituent of motor fuels, the desirability of this mixture as a constitutent of super-fuels for use under rich mixture conditions has never been recognized. When lead tetraethyl is added to this mixture of nonanes in a proportion of 4 ml. per gallon, the resulting fuel is better than isooctane containing lead tetraethyl in a proportion of 10 ml. per gallon, in accordance with AFD-3C engine test. This is one of the highest values for aviation fuels ever reported.

In view of the importance of this mixture of nonanes as a super-fuel, the production of the mixture of highly-branched nonenes from which the nonanes are obtained by hydrogenation is likewise of great consequence. Hence, the importance of a process whereby the yield of the mixture of the highly-branched nonenes is increased, is manifest.

I have found that in the interpolymerization of isobutene with isopentenes in the presence of sulfuric acid, the yields of the mixture of highly-branched nonenes can be materially increased by using sulfuric acid in concentrations varying within somewhat narrow limits, and by controlling the rate of heating the mixture of hydrocarbon reactants and catalyst, from the absorption temperature range to the final interpolymerization temperature.

I have also found that in the interaction between tertiary butyl alcohol and tertiary amyl alcohol in the presence of sulfuric acid, the yields of the mixture of highly-branched nonenes can be materially increased by using sulfuric acid in concentrations varying within somewhat narrow limits, and by controlling the rate of heating the mixture of the alcohols and catalyst, from the absorption temperature range to the final interpolymerization temperature.

In this connection, it should be noted that in so far as the nature and the magnitude of yield of product obtained are concerned, it appears to be immaterial whether the olefinic hydrocarbons are used as the reactants or whether the corresponding alcohols, i. e., tertiary butyl alcohol and tertiary amyl alcohol, are employed. The conditions are identical with the exception that when the alcohols are employed, the concentration of the sulfuric acid used must be higher to allow for the reduction in concentration caused by the chemical water of the alcohols. Therefore, when reference to isobutene and isopentenes and to sulfuric acid of a specified concentration is made hereinafter and in the claims, it must be clearly understood that tertiary butyl alcohol and tertiary amyl alcohol may be substituted for the olefinic hydrocarbon reactants and that when such substitution is made, the concentration of the sulfuric acid employed must be such that, taking into account the amount of the chemical water of the alcohols, the specified concentration will be achieved nevertheless. This can be readily calculated as is well known in the art.

Accordingly, it is an object of the present invention to provide an efficient process for the interpolymerization of isobutene with isopentenes. Another object is to provide a process for the manufacture of highly-branched nonenes. A more specific object is to afford a process for obtaining high yields of a mixture of highly-branched nonenes. A very important object is to provide an efficient process for effecting the interpolymerization of isobutene with isopentenes in the presence of sulfuric acid whereby high yields of a mixture of highly-branched nonenes are obtained.

Figure 2:
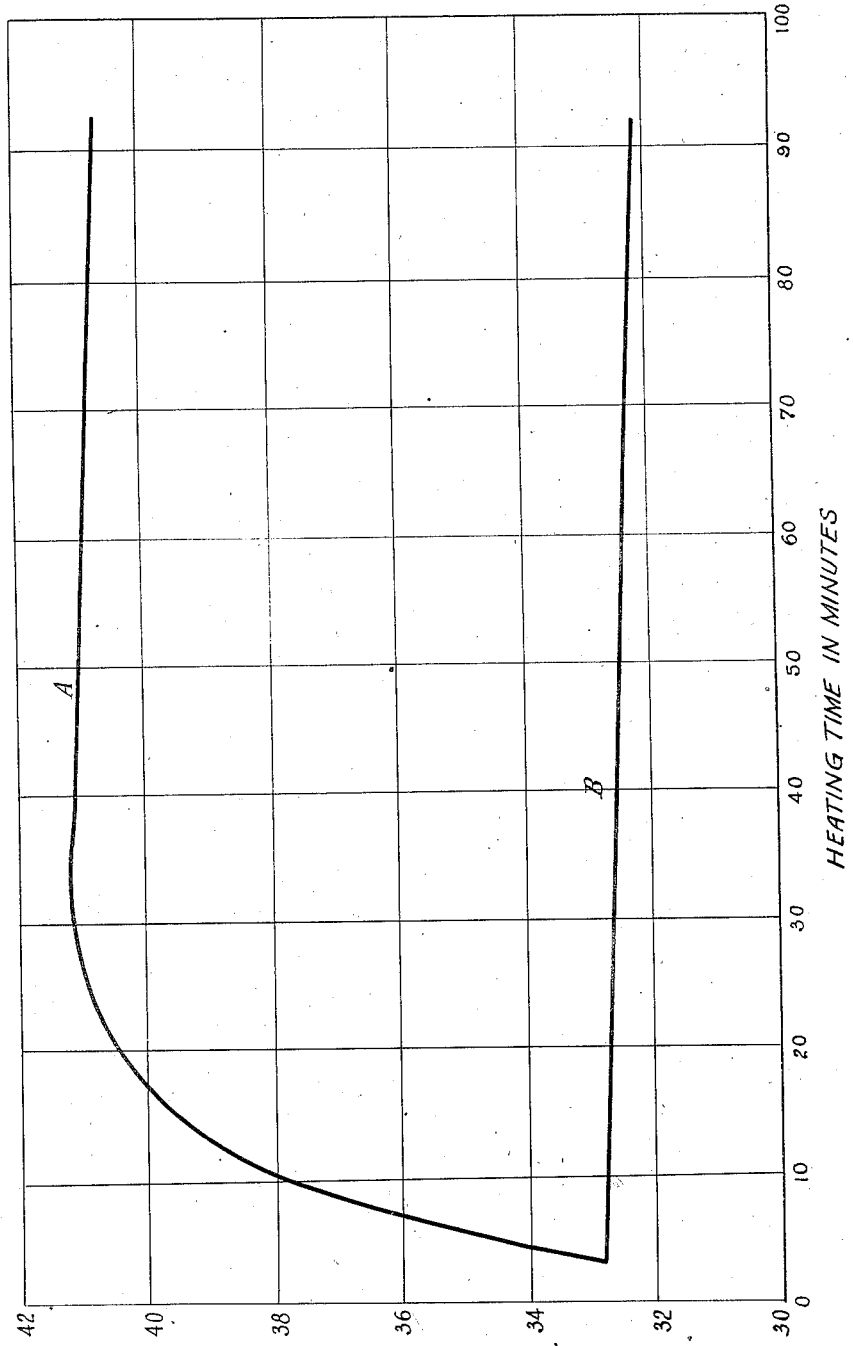

Other objects and advantages of the present invention will become apparent to those skilled in the art from the following description taken in conjunction with the following drawings in which:

Figure 1 shows a curve representing graphically the relationship between the per cent yield of the mixture of nonenes obtained by interpolymerizing isobutene with isopentenes in the presence of sulfuric acid, based on the weight of the olefinic hydrocarbons in the charge, and the concentration in per cent by weight of the sulfuric acid employed; and Figure 2 shows two curves representing graphically the relationship between the per cent yield of the mixtures of nonenes obtained by interpolymerizing isobutene with isopentenes in the presence of about 62% sulfuric acid, based on the weight of the olefinic hydrocarbons in the charge, and in the case of curve A, the time in minutes consumed to heat the mixture of hydrocarbon reactants and sulfuric acid from a temperature of about 45° C. to a temperature of about 80° C.; and in the case of curve B, the total time in minutes during which the reaction mixture was heated, the temperature being maintained at about 80° C. after the mixture of hydrocarbon reactants and sulfuric acid had been heated from a temperature of about 45° C. to a temperature of about 80° C. in about 3 minutes.

Broadly stated, the present invention provides an improved process for interpolymerizing isobutene with isopentenes in the presence of sulfuric acid, whereby high yields of nonenes are obtained, which comprises initially absorbing the olefinic hydrocarbon reactants in sulfuric acid in concentrations varying within somewhat narrow limits, at temperatures below those at which the interpolymerization reaction ordinarily takes place, and heating the mixture thus obtained to final interpolymerization temperatures at a specified, relatively slow rate.

In the process of the present invention, the olefinic hydrocarbons, 2-methyl propene and 2-methyl butene-1 and/or 2-methyl butene-2, may be used as well as the related alcohols, tertiary butyl alcohol and tertiary amyl alcohol. The olefinic hydrocarbons may be derived from any suitable source, as is well known in the art, and may be used either in the pure state or in admixture with other constituents not undesirable, especially the other pentenes, pentanes, butenes and butanes.

Sulfuric acid is the polymerization catalyst. However, I have found that the concentration of the sulfuric acid used governs to a considerable extent the yields of nonenes obtained by the interpolymerization operation. As shown in Figure 1, in the interpolymerization of isobutene with isopentenes, the best yields of nonenes, other variables remaining constant, are obtained when the concentration of the sulfuric acid employed varies between about 58% and about 66% by weight, and preferably, when the concentration of the sulfuric acid is about 62% by weight. With lower acid concentrations, the yield falls off and large amounts of isopentenes appear in the product; while with higher acid concentrations, there is an increasing formation of trimers. When tertiary butyl alcohol and tertiary amyl alcohol are used as the reactants, the limits of variation of the concentration of sulfuric acid will be the same after one has compensated for the chemical water of the alcohols, as stated hereinbefore.

There appears to be nothing particularly critical about the relative amounts of the olefinic hydrocarbon reactants in the charge and the amount of sulfuric acid employed. Ordinarily, I use a charge containing the iso-olefinic hydrocarbon reactants and sulfuric acid in a molecular proportion of about one to two of acid to one of iso-olefinic hydrocarbon. In regard to the relative proportions of isobutene to isopentenes in the charge, I generally use a charge in which isobutene is present in amounts that are in stoichiometrical equality or are in excess over the amounts of isopentenes present.

Likewise, the amounts of paraffinic hydrocarbons and of normal olefinic hydrocarbons in the charge can be varied within wide limits. The difference in the maximum yields shown in Figure 1 and in curves A and B of Figure 2 is due to the greater content of normal olefinic hydrocarbons in the charge stock used in the tests carried out for obtaining the data for the curve shown in Figure 1.

The interpolymerization operation is essentially a liquid phase operation. Accordingly, it may be carried out under atmospheric pressure or under pressures sufficient to keep the reactants in the liquid phase. In accordance with the process of my invention, the olefinic hydrocarbon reactants or the corresponding alcohols are initially mixed and stirred with sulfuric acid at absorption temperatures varying between about 0° C. and about 30° C., suitably, at a temperature of about 20° C. for a period of time sufficient to cause complete absorption of the reactants in the acid. Lower temperatures facilitate the absorption, while at higher temperatures, the absorption not only becomes increasingly difficult, but the possibility of effecting the polymerization of the normal olefinic hydrocarbons which may be present in the charge is also enhanced. The absorption mixture thus obtained is then gradually heated to within the interpolymerization temperature range. Interpolymerization begins more or less at about 45° C., and about 100° C. may be used as the final interpolymerization temperature. I prefer to use a temperature of about 80° C. as the final interpolymerization temperature. However, the rate of heating the absorption mixture within the interpolymerization temperature range is most important from the standpoint of the yields of nonenes obtained.

As stated hereinbefore, heretofore, it has been the practice to form the absorption mixture and then to heat the mixture to within the reaction temperature range as rapidly as possible with the apparatus in use, to effect the interpolymerization. In the prior art, there has been no apparent appreciation of the effect of the rate of heating within the reaction temperature range, upon the yields of desired polymer. On the other hand, my tests have shown that raising the temperature of the absorption mixture gradually from a temperature of about 45° C. to a temperature of about 80° C. in a period of time of about 30 minutes increases the yields of nonenes appreciably. This is clearly illustrated by curve A of Figure 2. The data for plotting this curve were obtained by carrying out the interpolymerization reaction in a 2.3-liter autoclave fitted with a double-paddle stirrer which rotated at 63 R. P. M. The autoclave was filled to the extent that there was only 10% vapor space at a temperature of 40° C., by charging it with 2086 grams of 66.4% sulfuric acid (to compensate for the chemical water of the alcohols and equivalent to 62.6% by weight on the basis of isobutene and isopentenes), 259 grams of tertiary butyl alcohol, and 308 grams of tertiary amyl alcohol. The vapor space was kept small to minimize the amount of isopentene present in the vapor at any time. The observed pressures were such that less than 2% of the isopentene from the charge ever appeared in the vapor phase. The molecular ratio of acid to olefinic hydrocarbons from the alcohols was 2.02:1 while that of isobutene to isopentenes was 1:1. The alcohols and acid were mixed at temperatures below 25° C. and stirred for fifteen minutes. The temperature of the autoclave jacket was then raised by circulating either hot water or steam therethrough. When the reactor temperature reached 45° C. a stop watch was started and the heat input regulated so that the increase in temperature was gradual and so that the time required for raising the temperature gradually from 45° C. to 80° C. could be varied. Runs were made where this time was 3, 9, 19.5, 43 and 90 minutes. Three minutes was the shortest time of heating used because, with the apparatus described, it was only possible to increase the temperature from 45° C. to 80° C. in about 3 minutes. At the conclusion of each run, the acid and polymer were cooled, drained from the autoclave, weighed and separated. The acid fraction was weighed. The hydrocarbon fraction was washed several times with water and dilute potassium hydroxide, dried with calcium chloride, weighed and a portion thereof distilled. For this purpose, a column having about 15 theoretical plates was used. The column was operated under total condensation with a reflux ratio greater than 20:1.

It will be seen from curve A of Figure 2, that as the time for gradually heating the absorption mixture from 45° C. to 80° C. increases, the nonene yield increases, reaching a maximum at about 30 minutes. Stated differently, in order to obtain increased yields of nonenes, the rate of heating the absorption mixture within the interpolymerization temperature range, or, more broadly, the rate of heating the absorption mixture from absorption temperatures or from temperatures below about 45° C. to final interpolymerization temperatures should vary between about 0.4° C. per minute and about 3.9° C. per minute, preferably, between about 0.4° C. per minute and about 2° C. per minute; the absorption temperature being more or less temperatures below those at which interpolymerization reaction occurs.

The increase in yield is not to be attributed to maintenance of the reaction mixture at the final interpolymerization temperature after the latter is reached, for prolonged periods of time. This is clearly shown by curve B of Figure 2. The data for plotting this curve were obtained in a manner similar to that described hereinbefore for obtaining the data for plotting curve A, with the exception that in these runs, the absorption mixtures were in all cases heated from 45° C. to 80° C. in three minutes, and then heating was continued for a total time of 9, 19.5, 43 and 90 minutes to maintain the reaction mixture at a temperature of 80° C. It will be seen from curve B, that prolonged maintenance of the reaction mixture at the final interpolymerization temperature after the latter is reached does not increase, but rather, decreases the yield of nonenes.

The nonene fraction obtained contains the following highly-branched nonenes: 2,3,3,4-tetramethyl pentene-1; 2,3,4,4-tetramethyl pentene-1; 2,3,4,4-tetramethyl pentene-2; 3,5,5-trimethyl hexene-2; 3,5,5-trimethyl hexene-3; and 2,4,4-trimethyl hexene-2. These nonenes are known in the art and upon hydrogenation yield the following highly-branched nonanes: 2,3,3,4-tetramethyl pentane; 2,2,3,4-tetramethyl pentane; 2,2,4-trimethyl hexane; and 2,4,4-trimethyl hexane. The first of these nonanes was first prepared at the National Bureau of Standards (see Special Report #1, Hydrocarbon Fuel Research Laboratory National Bureau of Standards, January 27, 1942); while the other three nonanes are disclosed in the patent to Deanesly et al., No. 2,342,074. These hydrocarbons were identified by subjecting samples to distillation in a 232 cm. x 2 cm. (diameter) tube packed 60% by weight, with $\frac{1}{16}$ in. single-turn metal helices and 40% by weight, with $\frac{3}{32}$ in. single-turn metal helices. This column had 95 theoretical plates.

The refractive indices ($n_d^{20}$) of 10 ml. portions were measured. On the basis of boiling points, refractive indices, densities and infra-red absorption spectra, these various nonanes were found to be present.

Prior to hydrogenation, the nonene fraction is treated for the elimination of impurities that poison hydrogenation catalysts. The hydrogenation may be effected suitably in the presence of a nickel hydrogenation catalyst at temperatures below about 200° C. and at atmospheric pressures or higher. The product will contain predominant amounts of the highly-branched nonanes referred to hereinbefore.

This application is a continuation-in-part of my copending application Serial Number 508,063, filed October 28, 1943.

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the appended claims.

I claim:

1. A process for obtaining high yields of nonenes, which comprises absorbing isopentenes and isobutene in sulfuric acid in concentrations varying between about 58% and about 66% by weight, at temperatures below about 45° C., to produce an absorption mixture, heating said absorption mixture to a temperature of about 45° C., and then gradually increasing the temperature of said absorption mixture to about 80° C. in a period of time of not less than about 30 minutes.

2. A process for obtaining high yields of nonenes, which comprises absorbing isopentenes and isobutene in sulfuric acid in concentrations varying between about 58% and about 66% by weight, at temperatures below about 45° C., to produce an absorption mixture, heating said absorption mixture to a temperature of about 45° C., and then increasing the temperature of said absorption mixture to about 80° C. at a rate varying between about 0.4° C. per minute and about 2° C. per minute.

3. A process for obtaining high yields of nonenes, which comprises absorbing isopentenes and isobutene in sulfuric acid in concentrations varying between about 58% and about 66% by weight, at temperatures below about 45° C., to produce an absorption mixture, heating said absorption mixture to a temperature of about 45° C., and then increasing the temperature of said absorption mixture to about 80° C. at a rate varying between about 0.4° C. per minute and about 3.9° C. per minute.

4. A process for obtaining high yields of nonenes, which comprises absorbing isopentenes and isobutene in sulfuric acid in concentrations varying between about 58% and about 66% by weight, at temperatures below about 45° C., to produce an absorption mixture, heating said absorption mixture to a temperature of about 45° C., and then increasing the temperature of said absorption mixture to final interpolymerization temperature at a rate varying between about 0.4° C. per minute and about 2° C. per minute.

5. A process for obtaining high yields of nonenes, which comprises absorbing isopentenes and isobutene in sulfuric acid in concentrations varying between about 58% and about 66% by weight, at temperatures below about 45° C., to produce an absorption mixture, heating said absorption mixture to a temperature of about 45° C., and then increasing the temperature of said absorption mixture to final interpolymerization temperature at a rate varying between about 0.4° C. per minute and about 3.9° C. per minute.

6. A process for obtaining high yields of nonenes, which comprises absorbing isopentenes and isobutene in sulfuric acid in concentrations varying between about 58% and about 66% by weight, at temperatures below about 45° C., to produce an absorption mixture, heating said absorption mixture to a temperature of about 45° C., and then increasing the temperature of said absorption mixture to final interpolymerization temperature at a rate of less than about 3.9° C. per minute.

7. A process for obtaining high yields of nonenes, which comprises absorbing isopentenes and isobutene in sulfuric acid in concentrations varying between about 58% and about 66% by weight, at temperatures below about 45° C., to produce an absorption mixture, heating said absorption mixture to a temperature of about 45° C., and then increasing the temperature of said absorption mixture to a temperature of about 80° C. at a rate of less than about 3.9° C. per minute.

8. A process for obtaining high yields of nonenes, which comprises absorbing isopentenes and isobutene in sulfuric acid in concentrations varying between about 58% and about 66% by weight, at temperatures below about 45° C., to produce an absorption mixture, heating said absorption mixture to a temperature of about 45° C., and then increasing the temperature of said absorption mixture to final interpolymerization temperature at a rate of less than about 2° C. per minute.

9. A process for obtaining high yields of nonenes, which comprises absorbing isopentenes and isobutene in sulfuric acid in concentrations varying between about 58% and about 66% by weight, at temperatures below about 45° C., to produce an absorption mixture, heating said absorption mixture to a temperature of about 45° C., and then increasing the temperature of said absorption mixture to a temperature of about 80° C. at a rate of less than about 2° C. per minute.

GEORGE CHRYSLER JOHNSON.

REFERENCES CITED

The following references are of record in the file of this patent:

UNITED STATES PATENTS

| Number | Name | Date |
|---|---|---|
| 2,342,074 | Deanesly | Feb. 15, 1944 |
| 2,133,732 | Hyser | Oct. 18, 1938 |
| 2,171,928 | Gage | Sept. 5, 1939 |
| 2,174,247 | McAllister | Sept. 26, 1939 |
| 2,237,292 | Deanesly | Apr. 8, 1941 |
| 2,258,368 | Stevens | Oct. 7, 1941 |
| 2,332,298 | Clarke | Oct. 19, 1943 |

FOREIGN PATENTS

| Number | Country | Date |
|---|---|---|
| 322,102 | Great Britain | Nov. 28, 1923 |

OTHER REFERENCES

Whitmore et al., article in Jour. Amer. Chem. Soc., 260–683.15, vol. 63; May 1941; pages 1460–1462.